(12) United States Patent
Hall et al.

(10) Patent No.: US 7,107,231 B1
(45) Date of Patent: Sep. 12, 2006

(54) FUEL DISPENSER INTEGRATED MEDIA DISPLAY SYSTEM

(75) Inventors: William Y. Hall, Frisco, TX (US); Ron Stapp, Bedford, TX (US)

(73) Assignee: Billboard Video, Inc., Grapevine, TX (US)

( * ) Notice: Subject to any disclaimer, the term of this patent is extended or adjusted under 35 U.S.C. 154(b) by 585 days.

(21) Appl. No.: 09/684,762

(22) Filed: Oct. 6, 2000

Related U.S. Application Data (63) Continuation-in-part of application No. 09/503,532, filed on Feb. 14, 2000.

(51) Int. Cl.
*G06Q 30/00* (2006.01)

(52) U.S. Cl. .......................... 705/26; 705/14

(58) Field of Classification Search .................. 705/26, 705/27, 14
See application file for complete search history.

(56) References Cited

U.S. PATENT DOCUMENTS

| | | | |
|---|---|---|---|
| 5,027,282 A | 6/1991 | Hollidge | 364/479 |
| 5,134,716 A | 7/1992 | Craig | 455/66 |
| 5,458,170 A | 10/1995 | Ferguson | 141/392 |
| 5,554,912 A * | 9/1996 | Thayer et al. | 315/157 |
| 5,642,484 A | 6/1997 | Harrison, III et al. | 395/214 |
| 5,717,374 A | 2/1998 | Smith | |
| 5,719,781 A | 2/1998 | Leatherman et al. | 364/479.02 |
| 5,734,851 A * | 3/1998 | Leatherman et al. | 345/771 |
| 5,798,931 A | 8/1998 | Kaehler | 364/479.01 |
| 5,890,520 A * | 4/1999 | Johnson, Jr. | 141/94 |
| 5,890,718 A | 4/1999 | Byon | 273/459 |
| 6,014,644 A * | 1/2000 | Erickson | 705/37 |
| 6,026,373 A | 2/2000 | Goodwin III | |
| 6,052,629 A * | 4/2000 | Leatherman et al. | 700/241 |
| 6,082,500 A | 7/2000 | Amo et al. | |
| 6,101,477 A | 8/2000 | Hohle et al. | |
| 6,133,912 A | 10/2000 | Montero | |
| 6,152,591 A * | 11/2000 | McCall et al. | 700/231 |
| 6,263,319 B1 | 7/2001 | Leatherman | |
| 6,288,688 B1 * | 9/2001 | Hughes et al. | 345/2.2 |
| 6,327,570 B1 | 12/2001 | Stevens | |
| 6,334,109 B1 | 12/2001 | Kanevsky et al. | |
| 6,408,278 B1 | 6/2002 | Carney et al. | |
| 6,422,464 B1 | 7/2002 | Teranova | |
| 6,442,448 B1 * | 8/2002 | Finley et al. | 700/231 |
| 6,446,192 B1 * | 9/2002 | Narasimhan et al. | 712/29 |
| 6,783,028 B1 * | 8/2004 | Ambrose et al. | 222/23 |

FOREIGN PATENT DOCUMENTS

WO    WO 03/021200 A1 *    3/2003

OTHER PUBLICATIONS

IBM Technical Disclosure Bulletin NN79081180: "Flow Control Valve for Hermetically Sealed Machine.", Aug. 1, 1979.*

* cited by examiner

*Primary Examiner*—Yogesh C. Garg
*Assistant Examiner*—Naeem Haq (57) ABSTRACT

A fuel dispenser advertising system. One or more fuel dispensers are provided each having a display subassembly. Each display subassembly presents audio and video information received wirelessly from a master interface system to a customer during a fueling operation. The master interface system receives periodic updated downloads from a central location.

20 Claims, 8 Drawing Sheets

FUEL DISPENSER INTEGRATED MEDIA DISPLAY SYSTEM

CROSS-REFERENCE TO RELATED APPLICATIONS

This application is a Continuation-in-Part of pending U.S. patent application Ser. No. 09/503,532 entitled "FUEL DISPENSER WITH VIDEO DISPLAY ADVERTISING" filed Feb. 14, 2000.

TECHNICAL FIELD OF THE INVENTION

This invention is related to a audio/video display system for presenting information to customers while obtaining fuel from a fuel dispenser.

BACKGROUND OF THE INVENTION

Technological advances in communication architectures have impacted consumers in many ways. With an increasing number of consumers becoming "connected" by either owning cell phones, pagers, facsimile (fax) machines, or linking with global communication networks, the potential for reaching these consumers with advertising becomes an increasing reality. For example, a consumer who has a fax machine connected at their home or office can receive a random call any time of day or night, which eventually results in a piece of paper in the output tray relating to some unsolicited product or service. Similarly, consumers who connect to and browse the most popular global communication network, the Internet, are bombarded with advertising on nearly every web page they view. The potential return on investment in advertising dollars from these technological applications is enormous. Therefore, the capability of placing advertising in front of the consumer as often as possible is a most desirable goal. In this fast-paced society, the capability of capturing the attention of a customer for only a few moments can provide a significant return on advertising investment dollars. Factor in the capability of focusing the advertising to the individual customer, and the potential for return increases even more.

One area ripe for this innovative application is fuel dispensers. When a customer pulls in to a gasoline station to fuel-up, several minutes of "idle" time are available for advertising to the customer. However, existing fuel dispenser systems are limited in that either the advertising is fixed to poles and the fuel pump chassis where the attention span of the customer is such that he or she may notice the advertisements only in a passing glance. More sophisticated fuel dispenser systems play audio messaging or a rudimentary video presentation to hopefully capture the customer's attention for more business. Furthermore, the implementation and maintenance of such systems is costly in that changes are manually intensive to replace placards and to change the programming piped to the fuel pump. It is therefore desirable to provide a fuel dispenser advertising system which targets the individual customer in order capture his or her attention, and is easy to implement and maintain.

SUMMARY OF THE INVENTION

The present invention disclosed and claimed herein, in one aspect thereof, comprises a fuel dispenser advertising system. One or more fuel dispensers are provided each having a display subassembly. Each display subassembly displays advertising information received wirelessly from a master interface system to a customer during a fueling operation.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
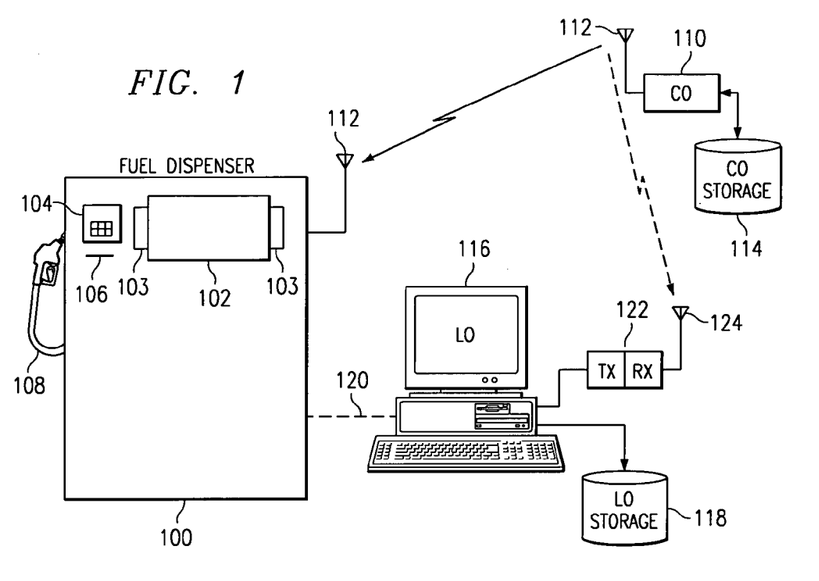
FIG. 1 illustrates a general block diagram of the fuel dispenser display advertising system, according to a disclosed embodiment.

Referring now to FIG. 1, there is illustrated a general block diagram of the fuel dispenser display advertising system, according to a disclosed embodiment. A fuel dispenser system 100 is shown at a fuel dispensing location having a display 102 and audio speakers 103 for presenting information to a customer parked next to the fuel dispenser 100 during fueling operations. The fuel dispenser 100 also has a keypad 104 for allowing input by the customer for selection of various options, e.g., the method of payment. The fuel dispenser 100 also comprises a card slot 106 (may also be a card swipe unit) into which a customer may insert a credit card or other card having a readable magnetic (or optical) strip to pay for the fuel which was dispensed, or any other function provided by the insertion of a card having a readable magnetic strip. The fuel dispenser 100 has a fuel nozzle assembly 108 for dispensing of the fuel into the customer's vehicle.

Communication between the fuel dispensing location having the fuel dispenser system 100 and a central office (CO) 110 is via a wireless communication system using antennas 112. The central office 110 also has associated therewith a CO storage device 114 for storing update information, customer profile information, and other store account information. The update information comprises news, weather information, sports, road condition information, etc., that a customer would find interesting during the fueling process. The customer profile information is obtained during an initial registration process for becoming a member of, for example, a loyalty program, a program which offers rewards or product discounts for frequenting the particular retail store or chain of stores for the purchase of fuel and other goods or services. Account information is obtained and stored according to the products or services the customer purchased at the participating store(s) to the loyalty program. The account information tracks the customer's buying habits at the participating store(s) and feeds this information back to the central office 110 in order to alter the programmed advertising to more accurately align updates, advertising, and product promotions with the customer's interests. Since the customer will be focused on the preferred updates, advertising can then be interjected while the customer is being attentive.

Therefore, when a customer enters a station to purchase fuel, he or she removes the nozzle assembly 108 from the fuel dispenser system 100 and inserts the nozzle into the vehicle gas tank opening. Removal of the nozzle assembly 108 from the fuel dispenser 100 is sensed by a sensor which triggers a signal to the fuel dispenser 100 control system that a customer is about to dispense fuel. The customer is then prompted by the display 102 to input a loyalty identification (ID) number prior to the fueling operation beginning. (Of course, if the customer is not participating in the program, he or she can simply fuel the vehicle and view or listen to the advertising as presented.) (Note that the customer need not be required to enroll in a loyalty program, but the disclosed architecture can be used for any customer when the customer provides some unique number which can be associated with only that customer. For example, a driver's license number, a social security number, a postal zip, code, etc., can be used to uniquely identify the customer. As long as the customer inputs a number which can uniquely identify him or her, fueling and point-of-sale transactions can be recorded and used to provide individualized programming to the customer.) The loyalty ID number can be input using keypad 104 or alternatively, an issued card which will fit into the card slot 106 where it can be read magnetically (or optically). After the user has input the loyalty ID number, the ID number is transmitted via the wireless transmission system 112 back to the central office 110 to obtain user profile information stored on the CO storage device 114. A matching operation is performed at the central office 110 using the loyalty ID to obtain a customer profile stored on the CO storage device 114. Once retrieved, the profile information is transmitted back to the fuel dispenser system 100 and processed such that advertising and updates are provided to the customer based upon the customer profile obtained from the CO storage device database 114.

Alternatively, the fuel dispenser system 100 at the fuel dispensing location can be connected to a local office (LO) computer system 116 which has a LO storage device 118 associated therewith. In this scenario, when the customer removes the nozzle assembly 108 from the fuel dispenser system 100, the fuel dispenser system 100 notifies the LO computer system 116 that a fuel dispensing transaction is about to commence. After input of the loyalty ID number by the customer, the loyalty ID is transmitted across a connection 120 to the LO computer system 116, which then transmits the loyalty ID via a transmitter/receiver interface device 122 and an antenna 124 to the central office 110. The central office 110 then responds in a similar manner by performing a lookup operation on the CO storage database 114 to obtain the customer profile. The customer profile is then transmitted back to the LO computer system 116 via a wireless transmission route using one of the antennas 112 to the antenna 124, or directly to the fuel dispenser system 100 using the antenna pairs 112.

Therefore, as the customer is performing the fueling operation, the fuel dispenser system 100 is running programming based upon the customer profile. The programming is in the form of commercials or product promotions provided by the gasoline station/convenience store, and also updates of, for example, news, weather, sports, road conditions, etc. When the customer has completed the fueling operation, he or she inserts the nozzle assembly 108 back into the fuel dispenser system 100. This triggers a sensor to "wind down" the programming by presenting a closing message to the customer.

Figure 2:
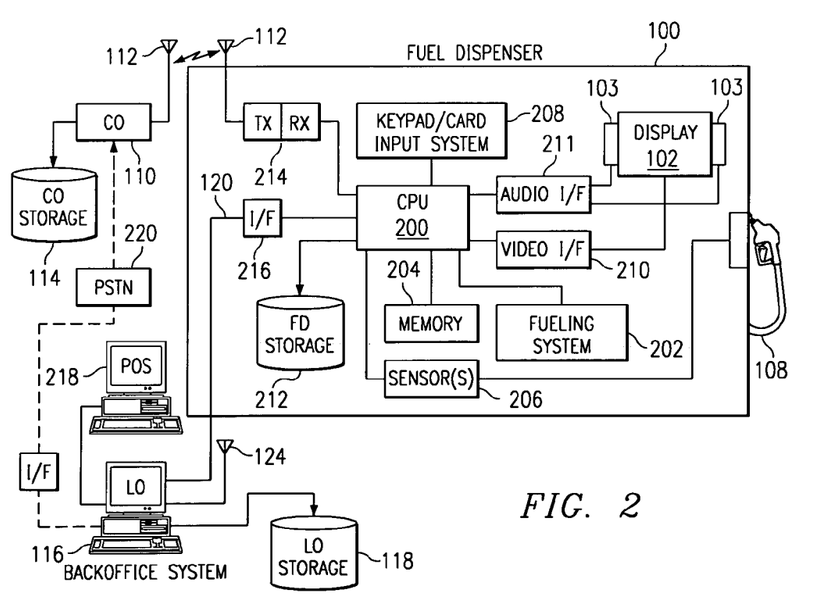
FIG. 2 illustrates a more detailed block diagram of the fuel dispenser advertising system.

Referring now to FIG. 2, there is illustrated a more detailed block diagram of the fuel dispenser advertising system. The fuel dispenser 100 comprises a CPU 200 which provides monitor and control functions for all aspects of system operation. Connected to the CPU 200 is a fueling system 202 which pumps and monitors the amount of fuel the customer is dispensing, a memory 204 for storing information during operation of the CPU 200, one or more sensors 206 for sensing the insertion or removal of the nozzle assembly 108 (and other sensors used for any number of functions to enhance the fuel dispensing experience of the customer). A keypad/card input system 208 is provided for insertion and reading of magnetic (or optical) credit card or loyalty card data to the CPU 200. The presentation output portion of the fuel dispenser system 100 comprises the display 102 and speakers 103 for providing an audio/visual effect corresponding to the programming information generated for the customer during dispensing of the fuel. A video interface 210 provides the interface between the CPU 200 and the display 102, and an audio interface 211 provides the audio signal coupling between the speakers 103 and the CPU 200.

The CPU 200 also has associated therewith a fuel dispenser (FD) storage unit 212 for storing data relevant to the current customer transaction, and also data that has been downloaded from the central office 110 or even from the LO computer system 116. The CPU 200 also interfaces to a transmitter/receiver 214 which provides the transmission means for the wireless communications to the central office 110 or other locations equipped to communicate therewith. As mentioned hereinabove, the fuel dispenser system 100 may also be connected via a hard wire connection 120 through an interface 216 to the LO computer system 116. Therefore, in operation, the central office 110, after receiving the initial registration information of the customer, stores the customer profile information on the CO storage device 114. On a regular basis (e.g., daily in the disclosed example), the central office 110 transmits via the wireless transmission system 112 to the fuel dispenser system 100, programming which includes commercials related to promotional discounts, and updates comprising news, weather, sports, travel information, etc. This information is stored on the FD storage device 212 for later retrieval during customer dispensing of fuel.

Alternatively, the central office 110 can transmit this information directly to the LO computer system 116 via the wireless system to the antenna 124 for storage on the LO storage unit 118. In this scenario, the LO computer system 116 then transmits the programming information across the connection 120 to the fuel dispenser system 100 for storage on the FD storage unit 212. As indicated hereinabove, when a customer stops to purchase fuel, he or she inputs the loyalty ID number which triggers download from the central office 110 of the customer profile 110 to the fuel dispenser system 100. The customer profile is encoded in a series of bits (a profile word) which merge into the regular programming provided by the central office 110 to provide individualized programming to the customer during the fuel dispensing operation. For example, during initial registration into the loyalty card program, if the customer indicated that he or she preferred travel information over news, weather or sports, then the programming presented to the customer during the fuel dispensing operation would be primarily focused on travel information. Alternatively, the customized programming can be prioritized according to what the customer indicated that he or she would want to see first, second or third. Similarly, the product promotions can be customized according to customer preferences, in that, if a customer prefers sporting activities over restaurants, then the customized programming can advertise sporting goods or events over those items related to restaurants during the fuel dispensing operation.

Also provided is a system whereby the customer may alter or change the programming during the fuel dispensing operation. For example, if the customer originally indicated during registration in the loyalty card program that he or she desired to see sports over news and weather, but later changed his or her mind to prefer travel information over sports, he or she could input this information during the fuel dispensing operation to alter the programming for that particular moment in time, and any future stops at participating fueling merchants. The change(s) in customer preferences could then be stored on the fuel dispenser system 100 storage unit 212, and later uploaded through the wireless transmission system 112 to the central office 110. This modified user profile can then be downloaded for the customer the next time he or she purchases fuel at any of the affiliated fuel dispensers 100 in operation in a wide variety of geographic locations. Similarly, if after the fuel dispensing operation, the customer enters the associated convenience or retail store and makes subsequent purchases at a point-of-sale system 218, the sales information can also be transmitted to the local office system 116 and stored on the LO storage unit 118. Subsequently, this information can also be uploaded to the central office system 110 either through the wireless transmissions system 112 or via the antenna 124 to the central office 110.

As indicated by dotted lines, the LO computer system 116 can be connected to the central office 110 via a public switch telephone network (PSTN) 220 to upload user preference and purchasing information to the central office 110. It can be appreciated that a more sophisticated implementation could control the dispensing of fuel with the programming. For example, when advertising related product promotions local to the gas station is presented to the customer, the CPU 200 could be programmed to slow down the pumping speed to allow more time for the advertising to complete. The pumping speed could then be increased when update information is being presented. With the disclosed architecture, any variations in programming could be provided to optimize the amount of advertising presented to the customer without unduly delaying the customer during fueling operations.

Figure 3:
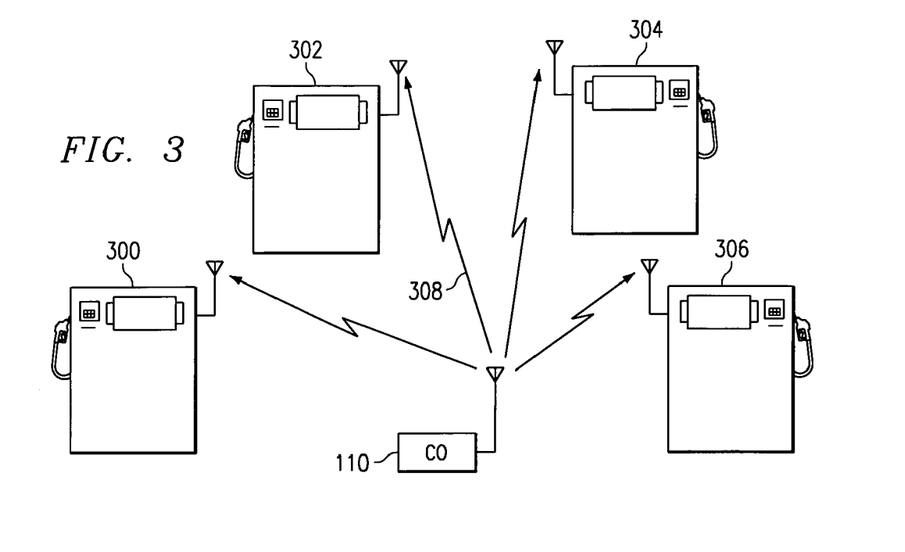
FIG. 3 illustrates a general block diagram of the centralized communication system according to a disclosed embodiment.

Referring now to FIG. 3, there is illustrated a general block diagram of the centralized communication system, according to a disclosed embodiment. Disclosed is a two-way communications system between the central office 110 and one or more fuel dispensing systems 300, 302, 304, 306. The wireless communication system can be any conventional digital or analog wireless technology. The fuel dispensing systems 300, 302, 304, and 306 comprise the same capabilities of the fuel dispenser system 100 mentioned hereinabove. In operation, the central office 110 provides periodic downloads of programming information to the fuel dispenser systems 300, 302, 304, and 306 comprising update information and promotional product information. In order to provide the most appealing information to the customer, it can be appreciated that update information is downloaded to the fuel dispensing systems 100 (or the fuel dispensing locations) daily, since news, weather, sports, road conditions, etc., are of daily interest to most customers. Similarly, when a customer chooses to purchase fuel at the fuel dispenser 302, and inserts a loyalty ID number (or unique number) into the respective fuel dispenser system 302, this information is transmitted over the wireless system 308 to the central office 110 to obtain the user profile information. The central office 110 then obtains the user profile information and generates a profile data word having bits which indicate the particular preferences indicated by the customer during the initial registration, and after subsequent use, updated customer transaction information. This data is then addressed to be transmitted to the respective fuel dispenser system 302 to provide individualized advertising and programming to the customer during the fuel dispensing operation.

Figure 4:
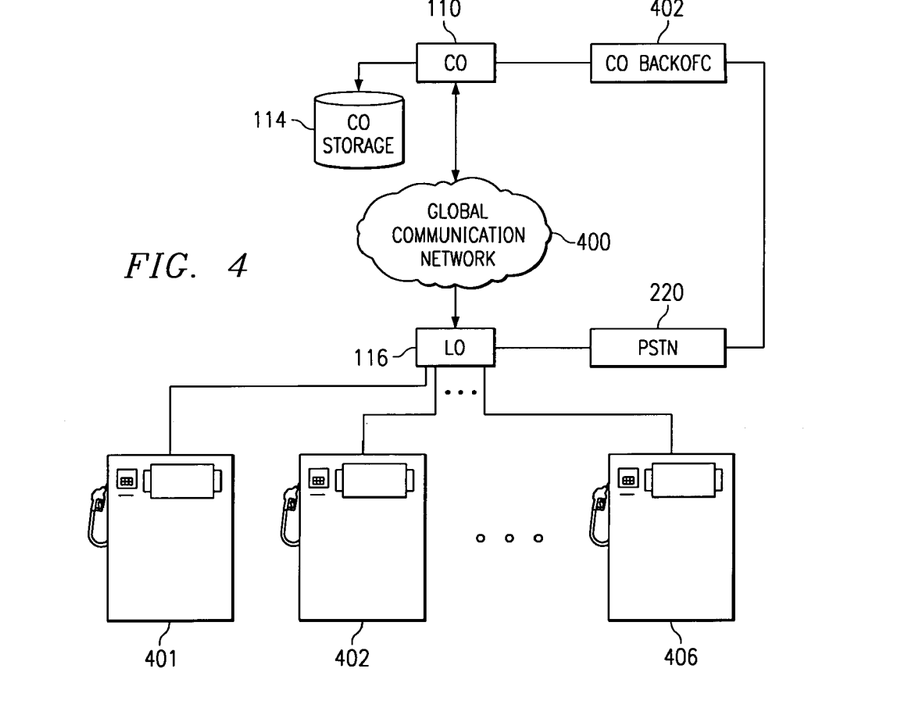
FIG. 4 illustrates an alternative embodiment for communicating between the central office and the local office fuel dispenser systems.

Referring now to FIG. 4, there is illustrated an alternative embodiment for communicating between the central office 110 and the local office fuel dispenser systems 100. This embodiment discloses a communication method using a packet-switched global communication network (GCN) 400 in place of the wireless communication system discussed hereinabove. When a customer chooses to purchase fuel at a first fuel dispenser 401 (the fuel dispensers 401, 402 and 406 having all the capabilities of fuel dispenser 100), he or she enters the loyalty ID number (or a unique number) which is transmitted from the fuel dispenser system 401 to the LO computer system 116 across the GCN 400 to the central office 110. The central office 110 then performs a lookup operation on the CO storage database 114 to match the loyalty ID number with the respective customer profile. Upon obtaining the customer profile from the CO storage database 114, a profile data word is generated and transmitted back across the GCN 400 via the local office system 116 to the respective fuel dispenser system 401. This information is then presented to the customer during the fuel dispensing operation. After the customer has finished dispensing fuel, or perhaps changed any preferences or the programming during the dispensing operation, this post-fueling information is then transmitted back to the local office system 116. This post-fueling information may be shipped either via the GCN 400 to the central office 110, or via the PSTN 220 to a CO backoffice system 402. The CO backoffice system 402 then passes the post-fueling information to the central office system 110 for storage on the CO storage device 114, for future reference.

It can be appreciated that in the disclosed embodiment providing access to the GCN 400, the customer can now be provided short-term access to all of the capabilities provided by such a network. For example, after inputting the loyalty ID and beginning the fueling operation, the customer may be provided messaging similar to e-mail such that personal messages may be sent to the specific fuel dispenser system 100 in use by the customer, and presented to the customer. Conventional messaging software and chat software can be implemented to provide short-term messaging while the fueling operation is being performed. The sophistication in the interactive capabilities provided to the customer by the fueling system 100 are numerous.

Figure 5:
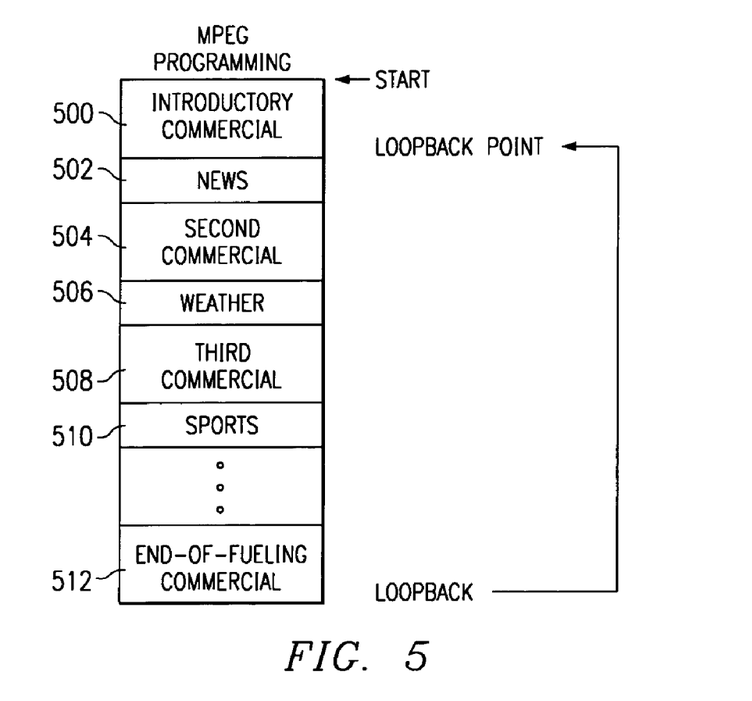
FIG. 5 illustrates a programming structure which is generated for presentation to the customer during the fuel dispensing operation.

Referring now to FIG. 5, there is illustrated a programming structure which is generated for presentation to the customer during the fuel dispensing operation. The programming structure is generated by merging update information, and advertising information in accordance with customer preferences stored in the customer profile. The programming comprises audio and video (visual) information, and may be provided in conventional formats such as MPEG (Moving Pictures Experts Group), which are conducive to many conventional transmission technologies. During initial registration by the customer into the loyalty program, the customer was requested to enter information according to a number of topics provided on the registration form. The registration form is designed to elicit customer responses under several categories which will ultimately determine the basic structure of programming presented to the customer during the fueling operation. In one example, the resultant programming comprises an introductory commercial 500 which is displayed to the customer as soon as the nozzle assembly 108 is removed from the fuel dispenser system 100. The introductory commercial could also be triggered by a proximity sensor which senses the presence of a vehicle parked close to the fuel dispenser system 100. Using the proximity sensor, the introductory commercial is initiated before the customer has to remove the nozzle assembly 108 from the fuel dispenser system 100. The introductory commercial 500 is followed by, in this particular example, a news segment 502. The news segment 502 is followed by a second commercial 504, which may direct the customer's attention to promotional products available for purchase at the convenience or retail store associated with the fuel dispensing system 100. Note that advertising can be interspersed, or layered in any fashion with the daily update information in order to maintain user attention during the fuel dispensing process.

The second commercial 504 is followed by a second update related to a weather segment 506, which is followed by a third commercial 508 and an update portion related to a sports segment 510. The programming continues until the fuel dispensing process is completed, as initiated by the customer placing the nozzle assembly 108 into the fuel dispenser system 100. At this point, the programming will jump to an end-of-fueling commercial which is then presented to the customer as a "Thank You" for purchasing fuel (or other products or services). If the fuel dispensing process is of such a duration that the programming is completed, it then loops back to an initial starting point and replays the information over. Note that initially, the structure of the programming is based upon the user preferences obtained during the initial registration of the customer into the loyalty program. In that the amount of time consumed during the fuel dispensing operation may be short, the programming is customized such that the commercials and update information are provided in a priority structure. It is possible to request that the customer provide input as to the approximate amount of fuel to be purchased such that the programming may be operated dynamically to finish at about the time the customer completes the fueling operation.

As mentioned hereinabove, the programming structure is customized according to the customer profile. Therefore, the general layout of the programming structure can remain the same with advertising interspersed among update information. However, the order of the update information (news 502, weather 506, sports 510, etc.) can be prioritized according to customer preferences listed in the customer profile. Furthermore, the fuel dispensing system 100 is operable to receive customer input during the fueling operation to change the order of the update information. This change in the order of update information is then recorded and transmitted back to the central office 110 to provide an update to the customer profile preferences the next time the customer purchases fuel.

The advertising can also be provided such that certain commercials are controlled by the central office 110 and other commercials are controlled by the local office. For example, the second commercial 504 may provide advertising about a corporate entity which owns the one or more local offices, while the third commercial 508 is reserved for advertising of the local office. The commercials can also be posted according to realtime activities by the customer. For example, if the customer is purchasing a high-grade fuel (more expensive), the fuel dispenser system 100 can react to this and alter the programming for advertising more expensive products. This feature can also be based upon what the customer purchases at the point-of-sale location, and also by the type of payment method. For example, if the customer pays for fuel using a "platinum" credit card, programming can be immediately altered to reflect advertising directed to more expensive products.

Similarly, the commercial advertising segments (504, 508, etc.) can be prioritized according to the customer profile. In order to attract the customer's attention to a product promotion, it is important to provide advertising which closely aligns with the highest activity of interest, as provided by the customer during initial registration into the loyalty program. For example, if the customer indicated during initial registration that he or she preferred outdoor activities, the retail store associated with the fuel dispenser 100 can focus advertising for this particular customer on foods, drinks, magazines, etc., commonly associated with such outdoor activities. The advertising may also be directed to other associated retail stores along a certain route that the customer may be traveling, in order to induce the customer to visit such stores during the commute or long trip. The programming could also provide music of the variety indicated by the customer. The targeted advertising content is not limited by the products and services offered for sale by the associated retail store or chain of stores, but can be anything.

Figure 6:
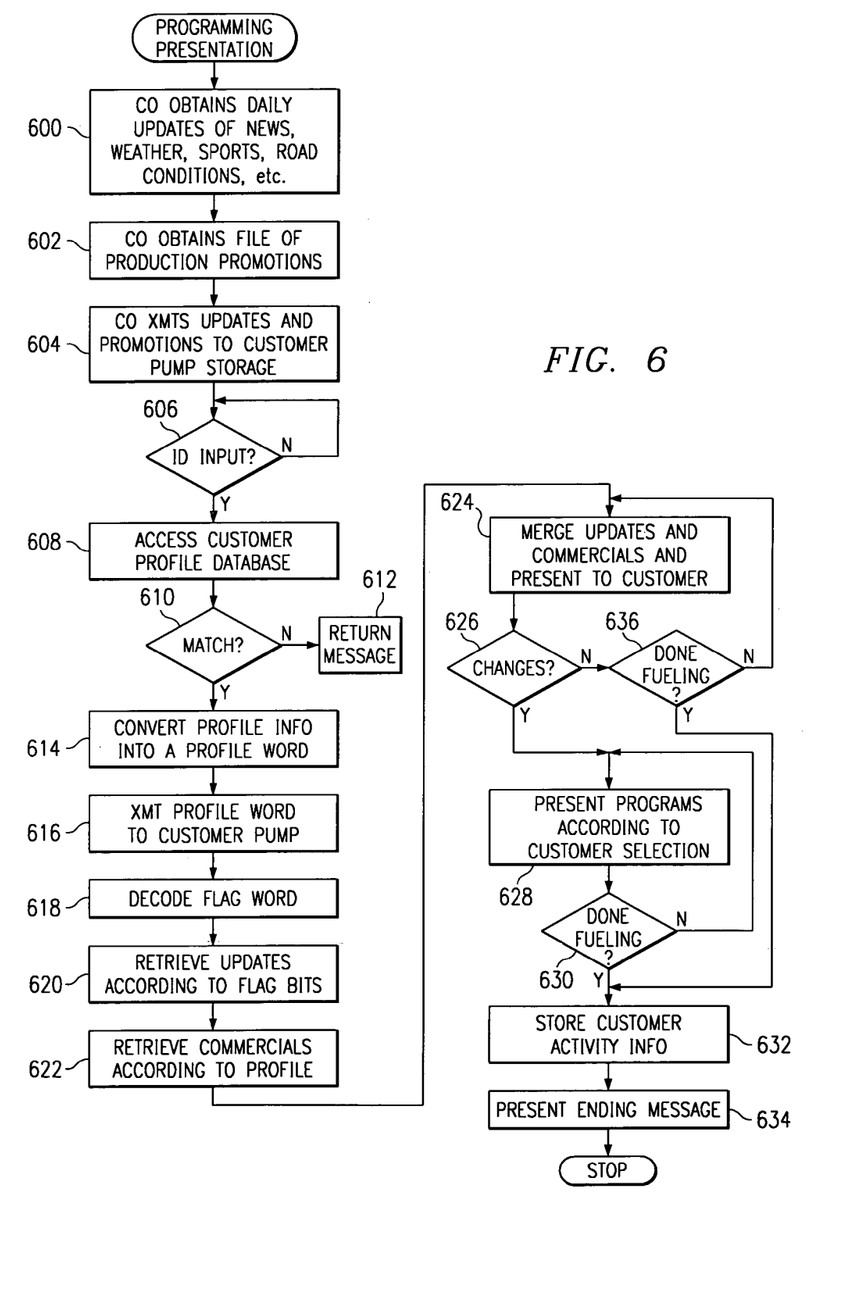
FIG. 6 illustrates a flowchart of the process of providing advertising to a customer at a fuel dispenser, according to a disclosed embodiment.

Referring now to FIG. 6, there is illustrated a flowchart of the process of providing advertising to a customer at a fuel dispenser. Flow begins at a starting point and moves to a function block 600 where the central office 110 obtains daily updates of news, weather, sports, road conditions, etc., for insertion into the daily programming information provided to customers. Flow then moves to a function block 602 where the central office 110 obtains a file of product promotions that has been generated for that particular day. Note that the promotions may be related to a corporate-wide promotion, in which case the central office 110 would transmit this information to many locations affiliated with the loyalty program (or disclosed architecture). Alternatively, the promotions could also be related only to a specific fuel dispensing location (i.e., local office), in which case the file is transmitted to only a single fuel dispensing location. Geography could be a factor in transmitting the file to a specific number of fuel dispensing locations only in that geographic area. Flow then moves to a function block 604 where the central office 110 transmits the daily updates and product promotions information to one or more fuel dispenser systems 100 (or locations) for storage on the respective fuel dispenser storage device 212 (or LO storage device 118). Flow is then to a decision block 606 where a determination is made as to whether the customer has input a loyalty ID. If not, flow is out the "N" path and loops back to the input of a decision block 606 to continue monitoring the keypad/card input system 208 for the input from the customer.

If the customer has input the loyalty ID information, flow is out the "Y" path to a function block 608 where the loyalty ID is transmitted back to the central office 110 to access a customer profile database. Flow is then to a decision block 610 in order to perform a matching operation between the loyalty ID and the variety of customer profiles stored on the CO storage database 114. If a match has not occurred, flow is out the "N" path to a function block 612 where a message is returned to the customer indicating that the loyalty ID needs to be either re-entered or it is invalid. If a match has occurred, flow is out the "Y" path to a function block 614 where the customer profile information is converted to a digital profile word. The profile word represents all of the preferences of the customer as stipulated during the registration period, customer preference updates provided at the fuel dispenser system 100 while dispensing fuel, and updates made according to customer purchases at affiliated points-of-sale, and methods and types of payment after the initial registration. Other factors may be monitored and recorded to more closely track customer activity while at the affiliated dispensing locations. These factors can then be fed back to the central office 110 to update the customer profile.

The profile word is then transmitted to the customer fuel dispensing system 100, as indicated in function block 616. Note that the profile word may be transmitted to any location connected to the fuel dispenser system 100. For example, it may be transmitted to the local office system 116 where it is processed to arrive at the programming information. The programming information can then be transmitted to the fuel dispenser system 100 for presentation to the customer during the fuel dispensing operation. It can be appreciated that a copy of the customer profile information can be stored locally on the LO storage device 118 in response to the customer establishing a trend of purchasing fuel at the particular location. This is similar to a "caching" operation where data that is accessed more frequently is stored locally such that it can be accessed and processed more quickly than the process of transmitting the loyalty ID to the central office 110, performing conversion there, and then transmitting it back to the local office for generation of the programming information. In this way, input of the loyalty ID results in the LO storage device 118 being checked first for the profile information. This feature also provides a backup in case the transmission link to the central office 110 is inoperative. Similarly, the customer profile information may be cached at the fuel dispenser system 100; since the customer may return to this location in the future (in those scenarios where only one fuel dispenser system 100 exists). In that way, the profile information can be cached at the fuel dispenser system 100 and need not be downloaded again unless updates to the user profile have been provided. If the customer fails to establish a trend of purchasing fuel at a particular fuel dispensing location, the downloaded profile word can simply be deleted after an extended period of time.

With the update and advertising information already having been transmitted earlier, the only data transmission from the central office 110 to the fuel dispensing location at the time of the fuel dispensing operation is the profile word. Flow is then to a function block 618 where the flag word is decoded in order to generate the programming to be presented to the customer. Flow is then to a function block 620 where updates are retrieved according to the particular profile bits set for this customer. Commercials or advertising are then retrieved and merged into the final programming structure according to bits set in the profile word, as indicated in function block 622. Flow is then to a function block 624 where the updates and commercials are merged into a program and presented to the customer at the fuel dispenser display 102. Note that audio speakers are provided for accommodating audio output signals of the program.

Flow is then to a decision block 626 to monitor whether the customer has chosen to modify the programming during this time. For example, if the customer chooses to watch or check on road conditions first, instead of watching the news as initially stipulated during the registration process, he or she may make a selection to change the output of the programming to immediately view the road condition information. Similarly, the customer may choose to look at sports as opposed to news, which was originally scheduled to be of higher priority during the fueling operation for this particular customer. Therefore, if a customer has chosen to make a change in the programming during the fueling operation, flow is out the "Y" path of decision block 626 to a function block 628 where the changes cause presentation of certain aspects of the programming to be altered such that updates are presented to the customer according to the customer's desires. (It can also be provided that the customer be allowed to alter the presentation of the advertising.) Flow is then to a decision block 630 to determine if the fueling process is completed. If a customer has not finished fueling, flow is out the "N" path back to the input of function block 628 to continue with the presentation of the programming to the customer. On the other hand, if the fueling process is completed, flow is out the "Y" path to a function block 632 to store aspects of customer activities, which in this case includes changes to the presentation of the programming, fueling and payment information, and any point-of-sale transactions. This activity information is then used to update the customer profile information. In one embodiment, this information can be transmitted back to the central office 110. Flow then continues to function block 634 where the customer inserts the fuel nozzle assembly 108 back into the fuel dispenser system 110, which triggers an ending message. The process then stops.

If no changes to the presentation of the programming are made by the customer, flow is out the "N" path of decision block 626 to another decision block 636 to determine if a fueling operation has completed. If the fueling operation has not completed, flow is out the "N" path back to the input of function block 624 to continue with the presentation of the programming to the customer. On the other hand, if no changes have been selected by the customer and the fueling operation has been completed, flow is out the "Y" path of decision block 636 to the input of function block 632 to store customer activity information which, in this case, does not include program presentation changes, but comprises fueling and payment information, and any point-of-sale transactions, for ultimate storage and accounting purposes. Flow is then to function block 634 to present the ending message to the customer at the completion of the fueling process. Flow is then to a stopping point.

Figure 7:
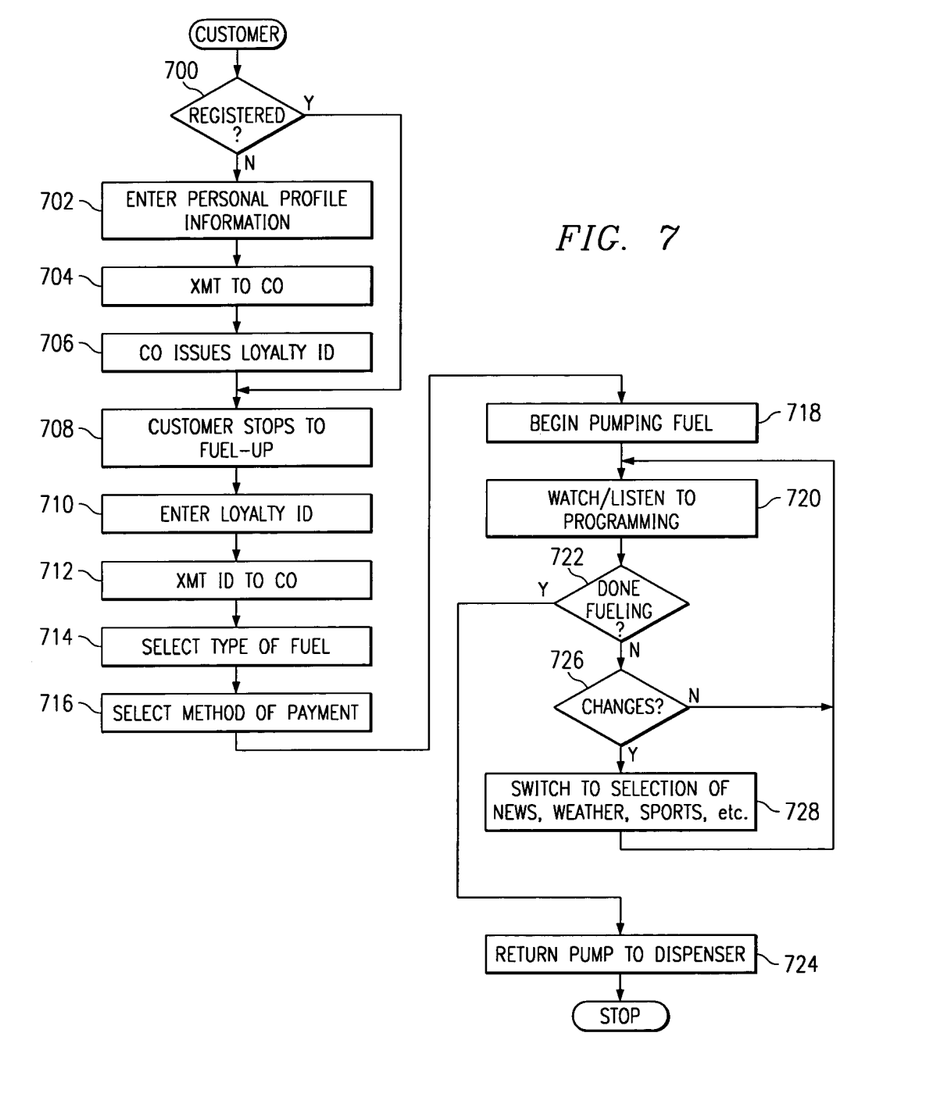
FIG. 7 illustrates a flowchart of the process for obtaining fuel from the perspective of the customer.

Referring now to FIG. 7, there is illustrated a flowchart of the process for obtaining fuel, from the perspective of the customer. The process begins at a starting point and flows to a decision block 700 where a determination is made as to whether the customer has already registered for the loyalty card program. If not, flow is out the "N" path to a function block 702 where the customer enters personal profile information. This registration process may be performed a number of ways, including filling out a hard copy form and mailing the information to the central office 110, entering the personal profile information into an electronic form of a website provided by the central office 110, providing the personal profile information over the telephone, or faxing the personal information in to the central office 110. Flow is then to a function block 704 where the personal profile information is transmitted to the central office 110. Flow is to a function block 706 where the central office issues a loyalty ID back to the customer, using any of the methods mentioned hereinabove. Flow continues to a function block 708 where the customer stops to fuel up at a fuel dispensing location that is affiliated with the loyalty program. The customer then enters his or her loyalty ID, as indicated in function block 710. The loyalty ID is then transmitted to the central office 110 (in one embodiment), as indicated in function block 712. The customer then selects the type of fuel for dispensing into his or her vehicle, as indicated in function block 714. The customer then selects the method of payment, as indicated in function block 716. As mentioned hereinabove, the method of payment may be by credit card, cash, or any form which is accommodated by the fuel dispenser system 100.

Flow is then to a function block 718 where the customer then begins pumping the fuel. Flow is then to a function block 720 where the programming is presented to the customer, and the customer watches and/or listens to programming as provided on the fuel dispenser display 102. Flow is then to a decision block 722 to determine if the customer has completed the fueling operation. If so, flow is out the "Y" path to a function block 724 where the customer returns the nozzle assembly 108 to the fuel dispenser system 100. As indicated hereinabove, the return of nozzle assembly 108 triggers a sensor 206 which indicates to the CPU 200 that the programming should wind down such that an ending message is presented to the customer. Flow is then to a stopping point.

On the other hand, if the fueling operation is incomplete, flow is out the "N" path of decision block 722 to another decision block 726 to monitor any changes made to the presentation of the programming by the customer. If there are no changes, flow is out the "N" path to the input of function block 720 where the programming continues. If the customer desires to change the programming, flow is out the "Y" path to a function block 728 where the customer then switches to a selection of one of the updates, for example, news, weather, sports, road conditions, etc. Flow is then back to the input of function block 720 where the programming is played to the customer. Returning to the top of the flowchart, if the customer is a registered loyalty card customer, flow is out the "Y" path of decision block 700 to the input of function block 708 where the customer stops to fuel up. Flow from this point is as was mentioned hereinabove.

Figure 8:
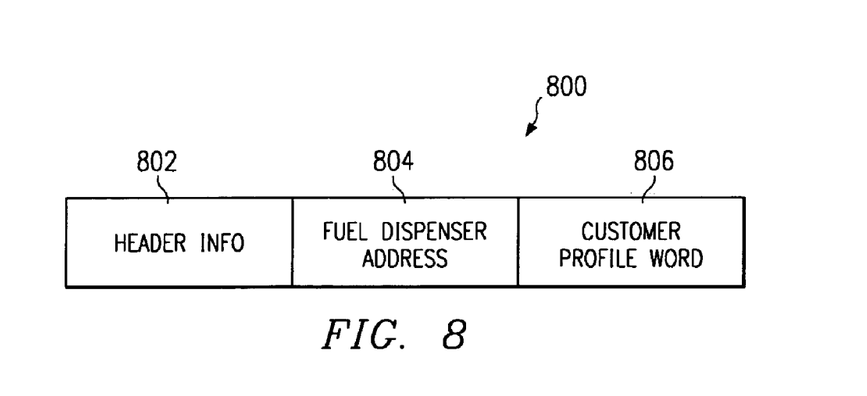
FIG. 8 illustrates a transmission data packet.

Referring now to FIG. 8, there is illustrated a transmission data packet, according to a disclosed embodiment. The exchange of data between the central office 110 and the one or more fuel dispenser systems 100 comprises one or more data packets carrying the necessary information for the generation of the customized programming for a particular customer. For example, a data packet 800 comprises a header word 802 which uniquely identifies the data packet 800 from other data packets being transmitted using the wireless system. The data packet 800 also contains a fuel dispenser address word 804 which uniquely addresses the specific fuel dispenser 100 to which the data packet 800 is being sent. Each of the one or more fuel dispenser systems 100 affiliated with the loyalty program is uniquely addressable by any of the disclosed communication systems (wireless, packet-switched network, etc.) The data packet also contains a customer profile word 806 which encodes all of the customer preferences. (Other words may be included in the data packet to ensure reliable transmission and receipt of the information.) At the receiving end, the data packet 800 is decoded to extract the fuel dispenser address 804 of the specific fuel dispenser 100. The customer profile word 806 is then extracted and processed by the CPU 200 to merge the customer profile information with update and advertising information. Note that the merging process (or program generation process) is performed at the fuel dispenser 100 in order to reduce the amount of information transmitted through the wireless system. The update and advertising information is downloaded to all fuel dispensing systems 100 at a designated time of day in order to provide the customer with the most up-to-date information.

It is also possible to download the update and advertising information to all local office systems 116, and let the local offices pass the information to the fuel dispenser systems 100. In this case, personnel at the local office may insert or modify the advertising to suit the location and clientele it services. The program generation step is then performed and downloaded from the local office system 116 to the fuel dispenser system 100.

The media display system comprises an integration of a number of features heretofore unavailable in the fuel dispensing industry. Generally, the system includes multi-media capabilities to provide an audio/visual experience during the fueling process. Since the system must be implemented in rugged outdoor conditions, the display comprises a brightness enhancement to provide convenient viewing of multicolor presentations by the customer in all weather conditions. The multi-media feature is triggered by a motion sensor which senses the presence of a customer vehicle proximate to the fuel dispenser. A photosensor provides feedback to an internal controller to control the level of display lighting during all ambient conditions. The system also accommodates a camera for customer security, a coupon dispenser, and many other features which will be discussed in greater detail hereinbelow.

Figure 9A:
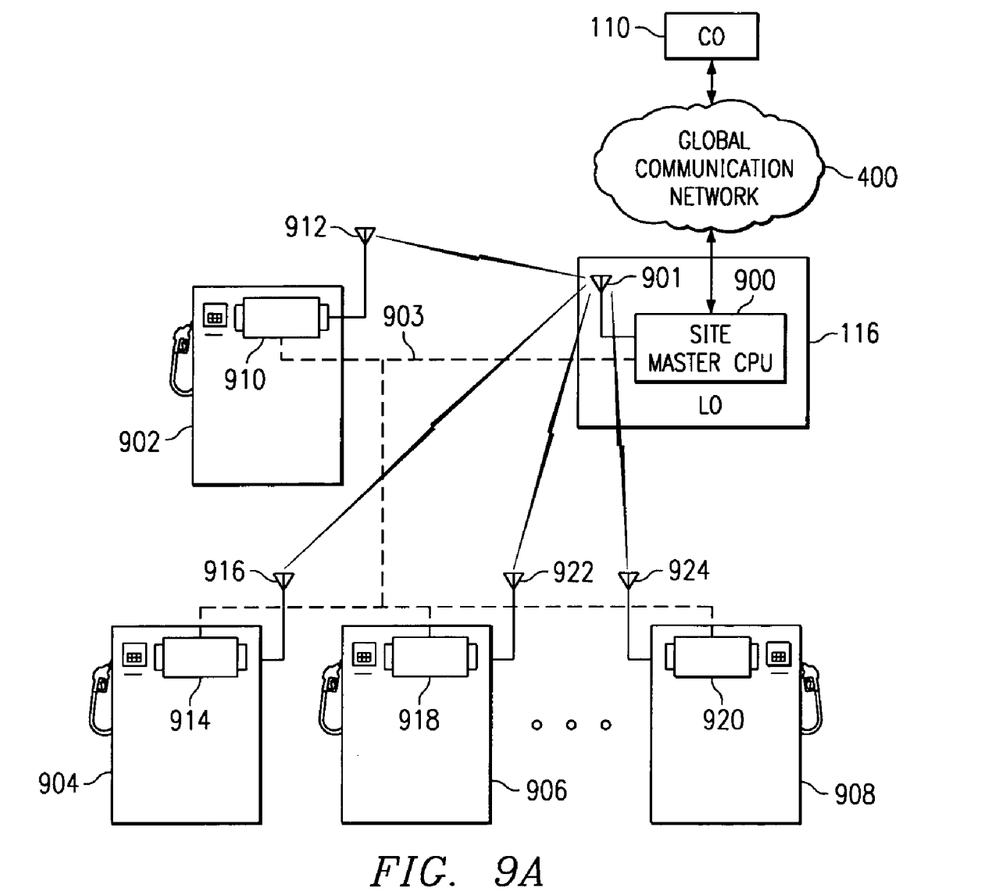
FIG. 9A illustrates an embodiment of the fuel dispenser display system.

Referring now to FIG. 9A, there is illustrated an embodiment of the fuel dispenser display system. In this particular embodiment, the CO 110 communicates with a remote site (LO 116) via the GCN 400. The LO 116 contains a site master computer 900 which provides the primary interface for file uploads and downloads between the LO 116 and the CO 110. The site master CPU 900 periodically checks back with the CO 110 computer system for updated downloads which contain audio, video (e.g., MPEG files), and text scheduling programs which are ultimately executed by the site master 900 and wirelessly transmitted via an antenna 901 to each fuel dispenser (902, 904, 906, and 908). A hardwire interface 903 can also be implemented in place of, or in addition to, the wireless link to provide an alternative communication link to the display subassemblies (910, 912, 914, and 916) of the respective fuel dispensers (902, 904, 906, and 908). The LO 116 can operate any number of fuel dispensers (not restricted to the four shown) limited only by the available communication bandwidth over which the audio/video files are transmitted. Each fuel dispenser 902 contains a display subassembly 910 which receives the transmitted signals from the site master CPU 900 via an antenna 912. Similarly, a second fuel dispenser 904 has associated therewith a display system 914 which receives wireless transmissions from the site master CPU 900 via an antenna 916. Other fuel dispensers 906 and 908 have corresponding display systems 918 and 920 which receive wireless transmissions from the site master CPU 900 via respective receiver antennae 922 and 924.

The site master CPU 900 is operable to login to the CO 110 server system and check for updated information which will ultimately be downloaded and integrated into the presentation program running on the site master CPU 900. Any updated files set for download are compressed for more efficient use of available connection bandwidth. Consequently, downloaded updates are transmitted compressed via the wireless transmission system to the site master 900. Upon receipt, the site master 900 automatically decompresses the downloaded file and integrates the file updates into the programming. In addition to downloading updated files, the site master CPU 900 also synchronizes its clock with the CO 110 server system. This is to ensure that all LO sites 116 executing software at approximately the same time, no matter where each is geographically located. Of course, time zone considerations would be taken into account to stagger the program executions according to the various time zones in which the LOs 116 reside. The site master CPU 900 can be programmed to login to the CO 116 server system at prescribed times. However, if the site master CPU 900 fails to check in within a prescribed time, it is presumed that the site master CPU 900 has failed for some reason and a technician will be automatically dispatched to investigate the reason for the failed login.

As mentioned hereinabove, the downloaded information comprises text files which may comprise schedules according to which the program may execute various features, for example, audio, graphics (e.g., MPEG), and other program files. The site master CPU 900 is operable to detect damaged or corrupt files, and will request download of "clean" files from the CO 110 server system to replace the damaged or corrupt files currently residing on the site master CPU 900. In response to download of the updated files, the site master CPU 900 automatically decompresses and loads into the local program structure the updated files to autoplay the latest information to the customers at the fuel dispensers. Decompression is automatic upon an indication that the file was received in its entirety, perhaps determined according to an error correction code.

The site master CPU 900 can connect to the GCN 400 using any of a number of standard interconnect protocols, for example, DSL, cable, modem, or satellite transmission path. The site master CPU 900, for security reasons, is designed to only dial out of the LO 116 site, and can not be dialed into by external systems. Therefore, as a security precaution, the capability of connecting into the site master CPU 900 is defeated to prevent computer hackers and the like from introducing unauthorized software for display to customers, or bringing the site master CPU 900 system down. The files downloaded from the CO 110 can be played in any order according to a structured schedule. For example, files can be randomly ordered, structured to be played interleaved with commercials, or certain files can be programmed to play only at specific times of the day or even on holidays or certain days of the week. More sophisticated implementations may use webcasting where all remote LO sites 116 dial-in to the CO 110 at a prescribed time for a blocked-out portion of commercial broadcast time paid for by a sponsor for substantially simultaneous programming to customers at all remote LO sites 116.

During its initial configuration, the site master CPU 900 is staged with a large number of commercials (e.g., approximately 200) such that downloading from the CO 110 is minimized from a point of initial set up and configuration. The site master CPU 900 can accommodate a hard disk drive, e.g., 30 GB storage, 128 MB of RAM, a CD-ROM drive, floppy disk drive, modem, network interface card, and transceiver, as some of the components of the system. No monitor is required since user intervention is not required for operation of the site master CPU 900. Since the fuel dispensers 902 communicating with the site master CPU 900 are slaved to that system, failure of the site master 900 automatically brings down the corresponding display subassemblies 910, 914, 918 and 920 of the fuel dispensers. In more complex implementations, however, the fuel dispensers could be made stand-alone by providing storage capacity and processor capabilities such that the downloaded files from the CO 110 could subsequently be downloaded into the fuel dispenser systems for stand-alone play had the site master 900 failed for any reason.

Figure 9B:
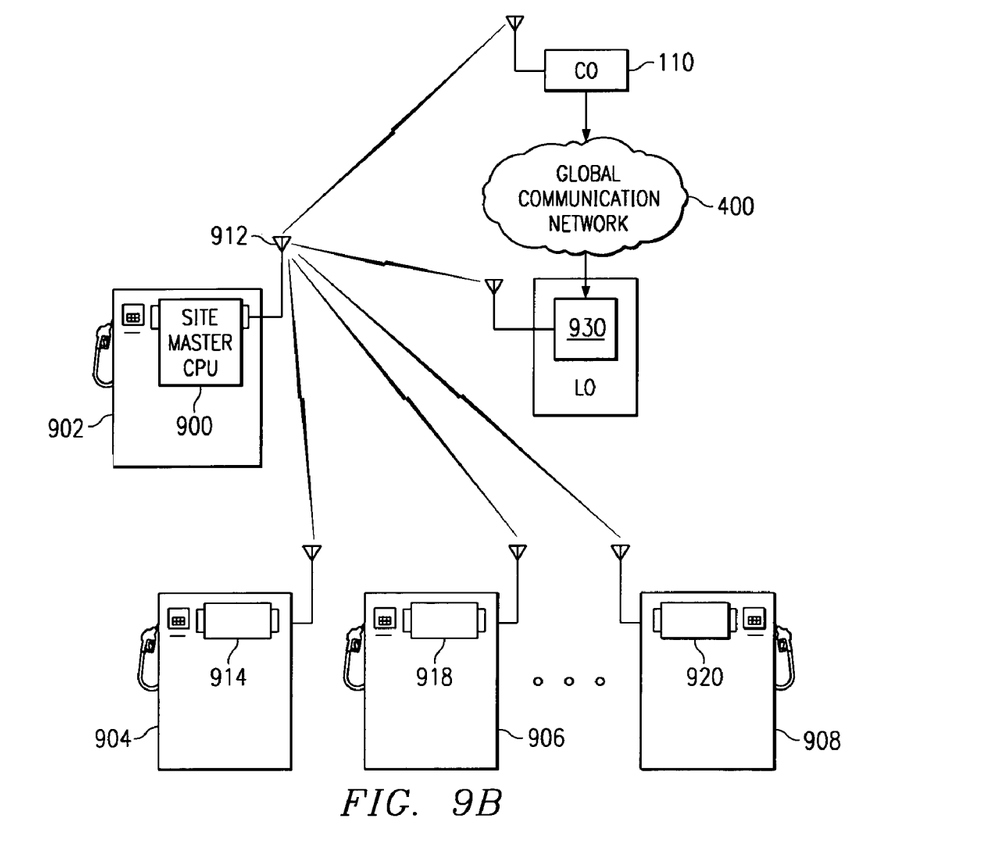
FIG. 9B illustrates an alternative embodiment where the site master CPU is relocated from the LO to one of the fuel dispensers, for example, the dispenser closest to the LO.

Referring now to FIG. 9B, there is illustrated an alternative embodiment where the site master CPU 900 is relocated from the LO 116 to one of the fuel dispensers 902 (called the "master" dispenser), for example, the dispenser 902 closest to the LO 116. The subassembly of the site master CPU 900 can be placed in the fuel dispenser 902, on top of the fuel dispenser 902, proximate to the dispenser 902, for example, attached to a nearby pole In this scenario, communications from the site master 900, when external to the LO 116, can be accomplished wirelessly by direct communications to the CO 110 using a satellite communications link, a land-based microwave link, or via the GCN 400 through an intermediary communications interface 930 at the LO 116 which receives the wireless communications from the site master 900 and converts the received information to a packet-switched protocol for transmission over the GCN 400.

Communication from the master dispenser 902 to the slave dispensers 904, 906, and 908 uses the same wireless architecture as mentioned hereinabove. The site master CPU 900 includes a multipurpose transceiver in that it is used to communicate with the CO 110, and also with the slave display systems of the dispensers 904, 906, and 908. Where not possible to use wireless communication from the site master 900 to the GCN 400 via the intermediary interface 930 or CO 110, technology exists which uses the local power grid as the physical link between nodes. For example, where the site master 900 is mated to the fuel dispenser 900, a power grid communication interface (not shown) can be implemented at the fuel dispenser 902 such that the site master 900 transmits signals though the power grid communication interface across the power grid to a compatible power grid communication interface located in the LO 116. The interface located in the LO 116 can then connect to the local PSTN to facilitate a connection to the CO 110 via a switched-circuit connection. Although the bandwidth is greatly reduced using this technology, the disclosed architecture is still operable to receive updates from the CO 100, and to provide advertising to the customer.

Figure 10:
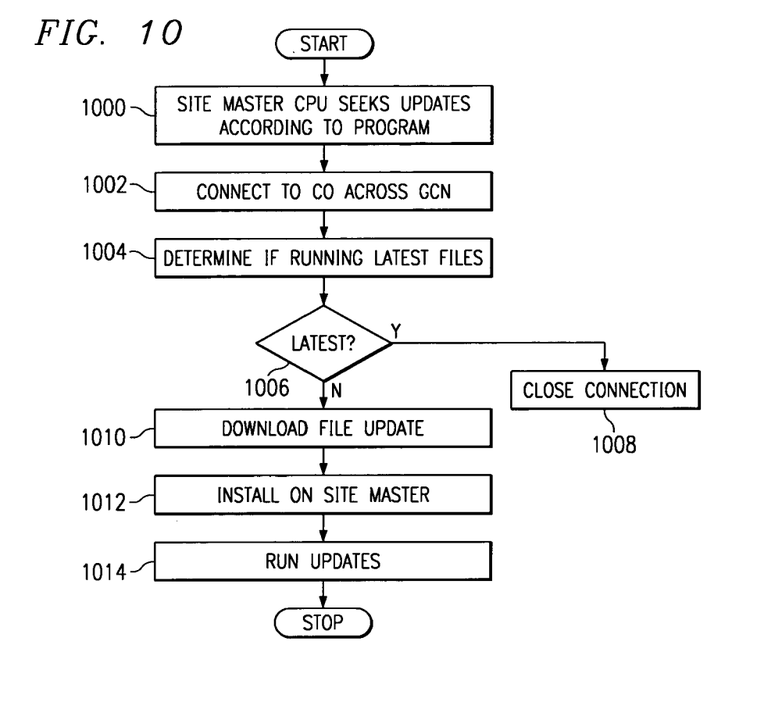
FIG. 10 illustrates a flowchart of the communications interchange between the CO and the site master CPU.

Referring now to FIG. 10, there is illustrated a flowchart of the communications interchange between the CO and the site master CPU. Flow begins at a Start point and moves to a function block 1000 where the site master CPU 900 executes a check-in process according to programmed instructions. The site master CPU 900 then connects to the CO 110 using any one of the aforementioned communication paths. When the link is made, the CO 110 first synchronizes the site master CPU clock. The CO 110 systems then checks available logs to determine if the site master CPU 900 has the latest information for display to the customers, as indicated in a function block 1004. If so, flow is out the "Y" path of a decision block 1006 to a function block 1008 to complete any final transactions, and close the connection. One process that occurs is that the site master 900 uploads a log of all the commercials and activities that have occurred since the last upload. This feature facilitates the accounting process for billing the sponsors of the advertisements presented to the customer. For example, if a commercial or advertisement was run multiple times over a period of time, the advertiser is billed accordingly. If the advertisement were run fewer times, they would be billed a lesser amount. This log information may also be provided to the advertiser as proof that the advertisements were actually played to the customer. More sophisticated implementations have the site master linking the advertisements with the point-of-sale activity in the LO 116 as some measure of feedback of the effectiveness of the commercials or advertisements.

If the site master 900 does not have the latest program files, flow is out the "N" path of decision block 1006 to a function block 1010, where the CO 110 system retrieves the necessary files from its database, and compresses them for transmission to the site master 900. Notably, only those files that need to be sent to the site master 900 are actually transmitted. Since the CO 110 system keeps a log of the files running on the site master 900, transmission of all files is unnecessary. It can be appreciated that some advertisers may want certain commercials played longer than others. Therefore, the update process would only download those files whose "lifetime" has expired. Flow continues to a function block 1012 where the site master 900 receives the compressed download and decompresses the files for integration into the programming currently running at the LO 116. The site master 900 is not required to be re-booted in order to run the new downloaded files. The new files are seamlessly integrated into the program which runs continuously for the presentation of information to the customers, as indicated in a function block 1014. Flow then reaches a Stop point.

Figure 11:
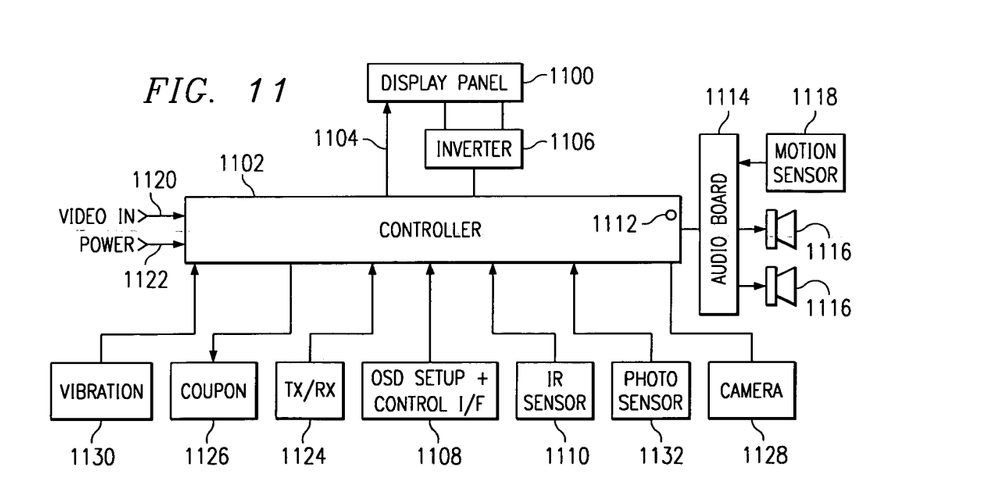
FIG. 11 illustrates a block diagram of the fuel dispenser display.

Referring now to FIG. 11, there is illustrated a block diagram of the fuel dispenser display subassembly. The display panel 1100 is an LCD (Liquid Crystal Display) panel with vandal-proof shielding. With the introduction of computing systems into the fuel dispensing business, computer components need to be "climatized" in order to be more resistant to the dynamics associated with environmental conditions, and "ruggedized" to be protected from breakage or damage caused by the customer or vandals. The shielding can be made of lexan or some other shatter resistant material. The display panel 1100 also has enhanced backlighting to ensure that colors and visual presentation of all advertisements and commercials can be easily seen by the customer at any time of the day, whether in bright sunny conditions, in lighting conditions hindered by bad weather, or at nighttime. A process called High Bright is introduced which enhances the brightness and/or the number of CCFT (Cold Cathode Flourescent Tubes) on the display.

Other features of the panel 100 include index matching, a reflective polarizer, and enhanced light guide. Index matching enhances the contrast of the panel by eliminating the reflective loss caused by bright ambient light. This process does not brighten the LCD panel 1100, but reduces "washout" caused by bright ambient light. Index matching provides a more viewable display in ambient light which is approximately two times brighter than that which would normally washout a standard LCD panel under similar conditions. Reflective polarization is a film enhancement that is internal to the LCD, and works by recycling most of the light that would normally have been absorbed by the rear polarizer. This feature enhances the brightness of the panel approximately 45%. The enhanced light guide collects approximately 30% more light from the CCFT and directs it forward out the LCD and toward the viewer.

An onboard interface controller 1102 controls all functions of the display subassembly 910. It provides 800×600×6 bit resolution (selectable for VGA), a page buffer architecture, multi-sync operation to 75 Hz, selectable vertical and horizontal image flip, enhanced on-screen mending with infrared selection, seven native OSD (On-Screen Display) languages, auto-sync detection for separate, composite and SOG, selectable image expansion for VGA-to-SVGA panels, ISD panel brightness and contrast controls, adjustable RGA levels, VESA DDC1, 2B and DPMS support, and optional LVDS/Panelink interface modules. An LCD signal cable 1104 connects from the controller 1102 to the display panel 1100 to provide video signals from the controller 1102 to the display 1100. A backlight inverter 1106 receives control from the controller 1102 and powers the CCFT lamps of the display panel 1100. An OSD menu function board 1108 provides a hardwire interface to the controller 1102 to accommodate tuning and quick adjustments of controls (e.g., auto setup, brightness, contrast, tuning, size, RGB color adjustments, image rotate and invert, image expansion, and image position). An infrared sensor assembly 1100 provides for remote control of the display setup and adjustment using the infrared port. The infrared assembly also includes an extension cable for locating the IR sensor away from the control board 1102 to, for example, the chassis wall of the fuel dispenser 902 for outside access by the IR remote control. The controller 1102 also includes a multicolor status LED to indicate various modes of the power status.

An audio board 1114 interfaces to the controller 1102 and drives one or more audio speakers 1116 which output audio signals to the customer. A motion sensor 1118 interfaces to the audio board 1114 to control when audio signals are output to the customer. For example, when the customer drives up to the fuel dispenser 902, the motion sensor 1118 detects the presence of the customer and/or customer vehicle, and triggers the audio board to increase the volume of the output audio signal so that the customer exits the vehicle to audible commercial signals. The detected presence of the customer/vehicle also determines the playing of the video files displayed to the customer. The controller 1102 has a video input 1120 for accommodating composite or S-video, and audio input from an external source. A power input 1122 provides 12 VDC to power the controller 1102. A power supply (not shown) receives 120 VAC at the fuel dispenser 902 and converts it to 12 VDC power for the display subassembly 910. Optional inputs include a wireless transceiver 1124 that operates at 2.4/5.8 GHz and connects to the controller 1102. The transceiver 1124 can transmit video and audio signals to LCD stations up to 400 feet away. A coupon dispenser 1126 is optional for the dispensing of coupons to the customer when at the pump 902. Dispensing of the coupons is under control of the controller 1102, and in communication with the site master CPU 900. This may be an automated feature triggered by the mere presence of the customer, or in response to the customer purchasing fuel, or in response to the customer making a purchase at the POS 218 of the LO 116.

Another optional feature is a remote camera 1128 connected to the controller 1102 and positioned at the fuel dispenser 902 for viewing the response of the customer as commercials are being watched. This provides a method of customer feedback to the owner/operator of the LO 116 as to the types and kinds of commercials presented. The camera can also be used as a security device to record instances of vandalism or to obtain information during a "drive-off" where the customer fuels the vehicle, and then drives away without paying. An optional vibration sensor 1130 connects to the controller 1102 to detect excessive vibration of the fuel dispenser 902. If the fuel dispenser 902 were impacted by the customer vehicle, the vibration sensor could sense this impact and shut down operation of the fuel dispenser 902 to ensure no accidental fires due to leaked fuel. The sensing of excessive vibration by the vibration sensor 1130 could also cause the controller 1102 to control the audio board 1114 to sound an alarm using the speakers 1116.

A photosensor 1132 detects ambient light and signals the controller 1102 to adjust the brightness of the LCD panel 1100. For example, when midday ambient light is potentially at its brightest, the photosensor 1132 triggers the controller 1102 to adjust brightness of the CCFTs of the LCD panel 1100 to its brightest setting to ensure that a customer can easily view the commercials. In the evening, when ambient light is reduce considerably, the brightness of the LCD panel can be reduced accordingly. This display and subassembly is housed in a weatherproof enclosure to ensure protection of internal components (e.g., power supply, LCD panel 1100, controller 1102, and wireless transceiver 1124) from the environment. The enclosure is cooled using bi-directional cooling fans (not shown) which are thermostatically controlled to ensure that the LCD temperature does not exceed a prescribed setting.

The disclosed system is also operable to provide an emergency broadcast system (EBS) and local public service (LPS) announcements. The CO 110 can interject such announcements into the LO 110 system to present to the customers such announcements. Notably, where severe weather is involved, the LO 116 could request that the CO 110 provide an override transmission to download the EBS to LPS announcements. Alternatively, the CO 110 could monitor weather and news information for its remote LO sites 116 and provide that information for download to the site master 900 when it checks-in for updates. Still further, the disclosed display subassembly 910 could be configured with sensors to monitor weather information, for example, barometric pressure, and temperature swings, which sensed conditions could trigger the site master 900 to login to the CO 110 for possible EBS or weather information. These weather monitoring sensors could also be configured into the site master 900 to trigger it so connect to the CO 116 for out-of-schedule EBS weather announcements for ultimate presentation to the customers. Personnel on duty at the time of any announcements normally broadcast over television or radio could also enable a switch which would trigger input of such announcement into the site master 900 for immediate presentation to customers.

Although the preferred embodiment has been described in detail, it should be understood that various changes, substitutions and alterations can be made therein without departing from the spirit and scope of the invention as defined by the appended claims.

What is claimed is:

1. A fuel dispenser advertising system, comprising:
   one or more fuel dispensers, having a central processing unit controlling fuel dispensing;
   a display subassembly associated with each of said one or more fuel dispensers and presenting advertising information to a customer; and
   a master interface system storing advertising information and transmitting said stored advertising information to each display subassembly by executing predetermined programming of said advertising information; and
   wherein said master interface system logs in to a central office system to download updates of said advertising information and synchronize transmitting of said stored advertising information with synchronizing information received from the central office system such that distribution of said advertising information at a location of said master interface system can be synchronized with delivery of similar advertising information at other remote locations;
   wherein the master interface system interacts with one or more external systems, including the central office system, only when the interaction is initiated by the master interface system; and
   wherein the central processing unit adjusts a pumping speed of at least one of the one or more fuel dispensers to allow presentation of the advertising information to be completed.

2. The system of claim 1, wherein each display subassembly comprises an electronic display for presenting said advertising information to said customer, said advertising information comprising audio and video information.

3. The system of claim 2, wherein said display is a liquid crystal display (LCD).

4. The system of claim 3, wherein said LCD has enhanced brightness during light ambient conditions which allows said customer to more easily view said displayed advertising information.

5. The system of claim 1, wherein said master interface system transmits said advertising information wirelessly to each display subassembly.

6. The system of claim 1, wherein only advertising information which is different than said advertising information already stored on said master interface system is downloaded from said central office.

7. The system of claim 1, wherein said master interface system is located adjacent to said one or more fuel dispensers.

8. The system of claim 1, wherein said master interface system is physically mated to one of said one or more fuel dispensers.

9. The system of claim 1, wherein said master interface system executes said predetermined programming according to a programmed schedule.

10. The system of claim 1, wherein said master interface system presents emergency broadcast and local public service announcements to said customer.

11. The system of claim 1, wherein said display subassembly is operable to present said advertising information when a sensor is triggered in response to an arrival of said customer at a select one of said one or more fuel dispensers.

12. The system of claim 1, wherein said display subassembly is operable to automatically adjust a brightness of an electronic display of said display subassembly in accordance with ambient light conditions.

13. The system of claim 1, wherein said display subassembly is operatively connected to a video camera which focuses on a demeanor of said customer during presentation of said advertising information.

14. The system of claim 1, wherein said display subassembly comprises a coupon dispenser for dispensing coupons to said customer in response to a promotional program.

15. A fuel dispenser advertising system, comprising:
one or more fuel dispensers, having a central processing unit controlling fuel dispensing;
one or more display subassemblies respectively associated with said one or more fuel dispensers and presenting information to a customer; and
a master interface system storing said information and transmitting said information to one or more of said one or more display subassemblies;
said master interface system also downloading an update of said information from a central office system, said update including only information determined at the central office system to be different than said information already stored on said master interface system;
said master interface system further for accessing the central office system at a prescribed time along with other master interface systems so that all master interface systems receive additional information for substantially simultaneous presentation by all master interface systems; and
wherein the central processing unit adjusts a pumping speed of at least one of the one or more fuel dispensers to allow presentation of the information to be completed.

16. The system of claim 15, wherein said master interface system transmits said information wirelessly to one or more of said one or more display subassemblies.

17. The system of claim 16, wherein said master interface system downloads said update wirelessly from the central office system.

18. The system of claim 17, wherein said master interface system is physically attached to one of said one or more fuel dispensers.

19. The system of claim 15, wherein said information is advertising information.

20. A fuel dispenser advertising system, comprising:
one or more fuel dispensers, having a central processing unit controlling fuel dispensing;
one or more display subassemblies respectively associated with said one or more fuel dispensers and presenting information to a customer; and
a master interface system physically attached to one of said one or more fuel dispensers, said master interface system transmitting said information wirelessly to one or more of said one or more display subassemblies;
said master interface system also downloading an update of said information wirelessly from a central office system; and
wherein the central processing unit adjusts a pumping speed of at least one of the one or more fuel dispensers to allow presentation of the information to be completed.

* * * * *